United States Patent
Doss

[15] 3,694,426
[45] Sept. 26, 1972

[54] CATIONIC AZO DYES

[72] Inventor: Nagib A. Doss, Loudonville, N.Y.

[73] Assignee: GAF Corporation, New York, N.Y.

[22] Filed: Oct. 20, 1969

[21] Appl. No.: 867,912

[52] U.S. Cl. ............260/156, 260/152, 260/154, 260/155, 260/162, 260/163, 260/187, 260/193, 260/196, 260/197, 260/199, 260/207, 260/207.1, 260/295 R, 260/471 R
[51] Int. Cl. .............................................C09b 29/08
[58] Field of Search..................260/156, 207.1, 152

[56] References Cited

UNITED STATES PATENTS

| | | | |
|---|---|---|---|
| 2,128,255 | 8/1938 | Krzikalla et al............ | 260/187 |
| 2,821,526 | 1/1958 | Boyd ........................ | 260/205 |

*Primary Examiner*—Lewis Gotts
*Assistant Examiner*—Donald M. Papuga
*Attorney*—Samson B. Leavitt and Walter C. Kehm

[57] ABSTRACT

Cationic azo dyes which are particularly suitable for dyeing synthetic fibers as well as natural fibers having the formula:

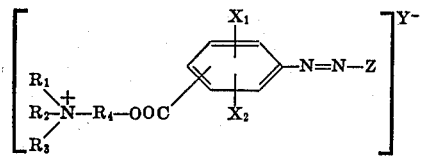

wherein $R_1$ and $R_2$ are each lower alkyl which may be substituted by a hydroxy radical, $R_3$ is a benzyl group, a cyclohexyl group, or a lower alkyl group which may be substituted by a hydroxy radical, $R_4$ is a normal or branched-chain alkylene radical having two to four carbon atoms, $X_1$ and $X_2$ are each hydrogen, chlorine, bromine, lower alkyl or lower alkoxy, Z is the radical of a coupling component, X is chlorine or bromine, and wherein $R_1$, $R_2$ and $R_3$, or $R_2$ and $R_3$ together with the contiguous nitrogen atom may represent a monocyclic group.

11 Claims, No Drawings

CATIONIC AZO DYES

This invention relates to azo dyes, and more particularly, this invention relates to cationic azo dyes.

Azo dyes have been used to dye natural fibers, such as wool and silk. It has been found in the past that certain azo dyes are particularly useful for dyeing synthetic fibers, such as acrylics. Furthermore, it has been found that cationic azo dyes are particularly useful for dyeing acrylic fibers and wherein $R_1$ and $R_2$ are each lower alkyl.

A new class of cationic azo dyes now has been found which are particularly useful for dyeing acrylic fibers and cationic dyeable nylon. These dyes are also useful to dye wool and silk, as well as acrylic fibers in a mixture with other fibers, such as wool or cellulosic materials. These dyes are represented by the general formula:

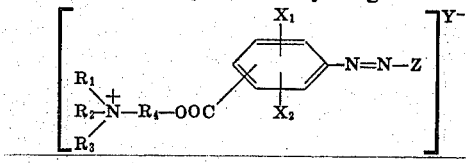

wherein $R_1$ is a lower alkyl group, $R_2$ is a lower alkyl group which may be substituted by a hydroxy radical, $R_3$ is a benzyl group, a cyclohexyl group, or a lower alkyl group which may be substituted by a hydroxy radical, $R_4$ is a normal or branched-chain alkylene radical having two to four carbon atoms, $X_1$ and $X_2$ are each hydrogen, chlorine, bromine, lower alkyl or lower alkoxy, Z is the radical of a coupling component devoid of solubilizing sulfonic and carboxylic acid groups, Y is chlorine or bromine, and wherein $R_1$, $R_2$ and $R_3$, or $R_2$ or $R_3$ together with the contiguous nitrogen atom may represent a monocyclic heterocyclic group. The dyes of the aforementioned formula have good light and wash fastness and good build-up properties. Additionally, they are capable of fast dyeing and have excellent sublimation properties.

Accordingly, it is a primary object of the present invention to provide a new class of dyes for dyeing both natural and synthetic fibers.

It is a further object of the present invention to provide a new class of azo dyes which are useful for dyeing such synthetic fibers as acrylic fibers.

It is yet another object of the present invention to provide a new class of cationic azo dyes which are particularly useful for dyeing acrylic fiber and cationic dyeable nylon, as well as wool and silk and mixtures thereof.

The dyes of the present invention are prepared in a conventional manner by esterifying a nitrobenzoyl chloride with a halo alcohol, and then treating the esterified product with an amine in order to form the quaternary ammonium derivative of the ester. The nitro group is then reduced to an amine, which is diazotized and coupled in a known manner with a coupler. As an alternative, the non-quaternized dyestuff can be produced and quaternization may be the last step of the reaction.

The following nitrobenzoyl chloride derivatives may be employed:
m-nitrobenzoyl chloride
p-nitrobenzoyl chloride
4-methyl-m-nitrobenzoyl chloride
4-methoxy-m-nitrobenzoyl chloride
2-chloro-m-nitrobenzoyl chloride
2-chloro-p-nitrobenzoyl chloride
3-chloro-p-nitrobenzoyl chloride
3-bromo-p-nitrobenzoyl chloride
2-chloro-p-nitrobenzoyl chloride
3,5-dichloro-p-nitrobenzoyl chloride
2,5-dimethyl-p-nitrobenzoyl chloride The haloalcohols which are employed in the esterification are exemplified as follows:
2-chloroethanol
3-chloro-1-propanol
1-chloro-2-propanol
4-chloro-1-butanol
1-chloro-2-butanol
4-chloro-2-butanol
chloro-tert. butanol
and the corresponding bromo derivatives.

The following exemplify the amines which may be used in the quaternization:
trimethylamine
triethylamine
tripropylamine
tributylamine
dimethylethylamine
methyldiethylamine
dimethylcyclohexylamine
diethylcyclohexylamine
dimethylbenzylamine
diethylbenzylamine
dimethylethanolamine
diethylethanolamine
triethanolamine
pyridine
morpholine, then treated with $CH_3I$, $(CH_3)_2SO_4$, and the like
1-methylpiperidine The coupling components which are suitable for use in this invention include all types of coupling components which are normally used in the production of azo dyes with the exception of those which contain solubilizing sulfonic acid and carboxylic acid groups. They include those compounds which are capable of coupling because of amine groups, hydroxy groups or enolizable ketone groups.

Those which couple due to a p-directing amine substituent and which are of particular interest are exemplified by the following:
methylaniline
dimethylaniline
diethylaniline
ethylbenzylaniline
chloroethylethylaniline
bromoethylethylaniline
cyanoethylethylaniline
di(hydroxyethyl)aniline
acetoxyethylethylaniline
carbethoxyethylethylaniline
m-toluidine
diethyl-m-toluidine
cyanoethylethyl-m-toluidine
chloroethylethyl-m-toluidine
hydroxyethylethyl-m-toluidine
2,5-dimethoxyaniline
5-methyl-o-anisidine
3-Di(hydroxyethyl)aminoacetanilide
3-Diethylaminoacetanilide
3-Diethylaminopropionanilide
3-Diethylaminobutyranilide 3-Diethylamino-4-methoxyacetanilide
3-Dimethylamino-4-ethoxyacetanilide
3-Cyanoethylethylamino-4-methoxyacetanilide
N-Ethyl-3-methyl-N(2-pyridylethyl)aniline However, it is not intended to limit the coupling components to compounds of the above type, as all other azo coupling components which are free from sulfonic acid and carboxylic acid groups may be used, exemplified by:

o-cresol
p-cresol
1-naphthol
2-naphthol
4-phenylphenol
1-naphthylamine
2-naphthylamine
N-ethyl-1-naphthylamine
toluene-2,4-diamine
1-methyl-5-pyrazolone
1,3-dimethyl-5-pyrazolone
1-phenyl-3-methyl-5-pyrazolone
1-(3-nitrophenyl)-3-methyl-5-pyrazolone
1-(2,5-dichlorophenyl)-3-methyl-5-pyrazolone
1-(2-chlorophenyl)-3-methyl-5-pyrazolone
1-(m-tolyl)-3-methyl-5-pyrazolone
1-phenyl-3-carbethoxy-5-pyrazolone
3-hydroxydibenzofurane
N-methyl-2,4-dihydroxyethylquinoline
barbituric acid
3-hydroxy-2-naphthanilide
3-hydroxy-2-naphth-o-anisidide
3-hydroxy-2-naphth-o-toluidide
3-hydroxy-2'-methoxy-5'-methyl-2-naphthanilide
3-hydroxy-N-(1-naphthyl)-2-naphthamide
3'-nitro-3-hydroxy-2-naphthanilide
acetoacet-o-anisidide
4'-chloro-2',5'-dimethoxyacetoacetanilide
3'-nitro-3-hydroxy-2-naphthanilide
4-(5-chloro-2-hydroxyphenylazo)resorcinol
7-hydroxy-4-(2-nitrophenylazo)-1-naphthylamine
4-(2,5-dimethoxyphenylazo)phenol
4-(2,5-dimethoxyphenylazo)-N-ethyl-1-naphthylamine
4-phenylazo-N-ethyl-1-naphthylamine Additionally, it is possible in the case where the coupler has a free amine to treat the dyestuff with a compound which is capable of forming a bis compound, such as fumaryl-chloride or phosgene. In this latter case, the urea-bis-dyestuff is produced.

The invention will be further described by reference to the following non-limiting examples thereof.

EXAMPLE 1A 200 g. of 4-nitrobenzoyl chloride and 200 g. of chloroethanol were heated at 120°–125° C. for 8 hours. The product was then poured into 800 ml. water at 50°–55 C., stirred for 5 minutes, let stand and then decanted. The water extraction was repeated twice. To the charge was added 5 g. of sodium bicarbonate to pH 7–8. It was stirred to cool, filtered and vacuum dried. The product had the formula:

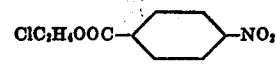

245 g. of this product was combined with 350 ml. pyridine and heated overnight at 100° C. It was then cooled to 10° C., filtered, washed with petroleum ether and air dried. The product had the formula:

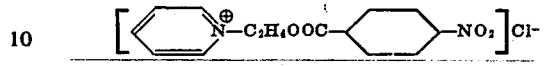

m.p. 195.0–195.8° C., 232 g.

EXAMPLE 1B 121 g. of 60 mesh finely powdered iron, 250 ml. of water and 5 ml. of formic acid were heated together at 95° C., for 1 hour. It was cooled to about 80° C., and over a period of 1 to 2 hours. 100 g. of the product of Example 1A was added. It was held at 80° C., for 2 hours, then cooled to 60° C. 7 g. of soda ash was then added to Brilliant Yellow alkalinity. It was filtered and the filter cake washed with a little water. The filtrate and wash water were combined and acidified with hydrochloric acid. An average yield was about 76percent theory, based on the initial 4-nitrobenzoyl chloride. The product had the formula:

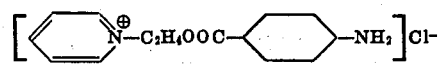

EXAMPLE 2

113 ml. of the solution of Example 1B (0.1 mole diazo) and 24 ml. of hydrochloric acid was iced to 0° C. 18 ml. of sodium nitrite solution (31.5% NaNO$_2$) was stirred in slowly at 0°–5° C. The excess nitrite was removed by treatment with sulfamic acid.

17 g. of dimethoxyaniline, 100 ml. of water and 12 ml. of hydrochloric acid were heated to solution, then iced to about 10° C. and poured into the diazo. It was stirred 2 hours, treated with 20 g. of sodium acetate and 20 g. of soda ash, filtered and dried, 60 g. of product being obtained which had the formula:

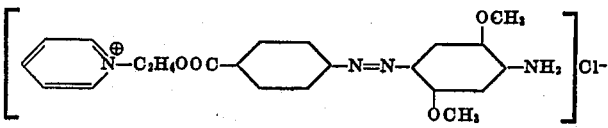

The product dyes acrylic fibers in reddish orange shades.

EXAMPLE 3

Examples 1 and 2 were repeated except that the 4-nitro-benzoyl chloride was replaced by the same amount of 3-nitro-benzoyl chloride. This dyestuff is of particular value for dyeing cationic dyeable nylon in orange shades.

EXAMPLES 4 – 52

In a manner similar to Examples 1 and 2, the following dyestuffs were prepared:

| Example | Tert. amine | Nitrobenzoyl chloride | Coupler | Color |
|---|---|---|---|---|
| 4 | Pyridine | 4-nitrobenzoyl chloride | p-Cresol | Yellow. |
| 5 | do | do | 1-naphthol | Yellowish red. |
| 6 | do | do | 2-naphthol | Orange. |
| 7 | do | do | 3-(dihydroxyethylamino) acetanilide | Yellowish red. |
| 8 | do | do | 2-naphthylamine | Scarlet. |
| 9 | do | do | Dimethylaniline | Orange. |
| 10 | do | do | m-Toluidine | Yellow. |
| 11 | do | do | 1-naphthylamine | Scarlet. |
| 12 | do | do | 3-diethylaminoacetanilide | Orange. |
| 13 | do | do | N,N-diethyl-m-toluidine | Yellow. |
| 14 | do | do | 5-methyl-o-anisidine | Reddish yellow. |
| 15 | do | do | 1-phenyl-3-methyl-5-pyrazolone | Greenish yellow. |
| 16 | do | do | 1-methyl-5-pyrazolone | Do. |
| 17 | do | do | N-cyanoethyl-N-ethyl-m-toluidine | Red. |
| 18 | do | do | N-ethyl-N-(pyridyl-2-ethyl)-m-toluidine | Red. |
| 19 | do | do | N-benzyl-N-ethylaniline | Scarlet. |
| 20 | do | do | p-Phenylphenol | Yellow. |
| 21 | do | do | N-methyldioxyquinoline | Greenish yellow. |
| 22 | do | do | Acetoacetanisidide | Do. |
| 23 | do | do | 4'-chloro-2',5'-dimethoxy-acetoacetanilide | Do. |
| 24 | do | do | Toluene-2,4-diamine | Red. |
| 25 | do | do | 1-(2,5-dichlorophenyl)-3-methyl-5-pyrazolone | Greenish yellow. |
| 26 | do | do | 1-(3-nitrophenyl)-3-methyl-5-pyrazolone | Do. |
| 27 | do | do | 1-(chlorophenyl)-3-methyl-5-pyrazolone | Do. |
| 28 | do | do | 2-naphthol | Orange. |
| 29 | do | do | 1-naphthol | Yellowish orange. |
| 30 | do | do | 1-methyl-5-pyrazolone | Greenish yellow. |
| 31 | do | do | 1-phenyl-3-methyl-5-pyrazolone | Do. |
| 32 | do | do | 5-methyl-o-anisidine | Yellowish orange. |
| 33 | do | do | N,N-diethyl-m-toluidine | Scarlet. |
| 34 | do | do | N,N-diethyl-m-acetanilide | Do. |
| 35 | do | do | 1-naphthylamine | Do. |
| 36 | do | do | p-Cresol | Yellow. |
| 37 | do | do | m-Toluidine | Do. |
| 38 | do | do | N,N-dimethylamine | Orange. |
| 39 | do | do | 2-naphthylamine | Do. |
| 40 | do | 4-nitrobenzoyl chloride | 2,5-dimethoxyaniline ⟶ phenol | Red. |
| 41 | do | do | 2,5-dimethoxyaniline ⟶ N-phenyl-1-naphthylamine | Blue. |
| 42 | Triethanol-amine | do | 1-phenyl-3-methyl-5-pyrazolone | Yellow. |
| 43 | Dimethylcyclohexylamine | do | do | Greenish yellow. |
| 44 | Dimethylbenzylamine | do | do | Do. |
| 45 | Triethylamine | do | do | Do. |
| 46 | Pyridine | 3-nitro-p-toluoyl chloride | do | Do. |
| 47 | do | 2-chloro-3-nitro-p-toluoyl chloride | do | Do. |
| 48 | do | 2-bromo-3-nitro-p-toluoyl chloride | do | Do. |
| 49 | do | 3-methoxy-4-nitro benzoyl chloride | do | Do. |
| 50 | do | 3-ethoxy-4-nitro-benzoyl chloride | do | Do. |
| 51 | do | 4-methoxy-3-nitro benzoyl chloride | do | Do. |
| 52 | do | 4-nitrobenzoyl chloride | 3-hydroxy-2-naphth-o-anisidide | Scarlet. |

What is claimed is:

1. A cationic azo dye having the formula:

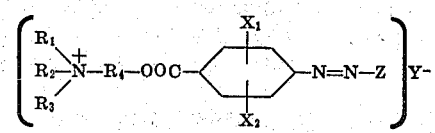

wherein $R_1$ and $R_2$ are each lower alkyl or hydroxy-substituted lower alkyl, $R_3$ is benzyl, cyclohexyl, lower alkyl or hydroxy-substituted lower alkyl, $R_4$ is selected from the group consisting of normal and branched chain alkylene radicals having to to four carbon atoms, $X_1$ and $X_2$ are each hydrogen, chlorine, bromine, lower alkyl or lower alkoxy, Z is the radical of a coupling component devoid of solubilizing sulfonic and carboxylic acid groups and containing a p-directing amine substituent in a benzene or naphthalene ring, Y is chlorine or bromine and additionally

may represent pyridyl, morpholinyl or piperidinyl.

2. The dye of claim 1, wherein $R_4$ is ethylene.
3. The dye of claim 1, wherein $X_1$ and $X_2$ are hydrogen.
4. The dye of claim 1, wherein the azo group is in the para position to the acyl group.
5. The dye of claim 1, wherein the azo group is in the meta position to the acyl group.
6. The dye of claim 1, wherein $X_1$ is hydrogen and $X_2$ is selected from the group consisting of methyl, chloro, bromo, methoxy and ethoxy radicals.
7. The dye of claim 1, wherein $X_1$ and $X_2$ are chlorine radicals.
8. The dye of claim 1, wherein $X_1$ and $X_2$ are methyl radicals.
9. The dye of claim 1, wherein

represents triethanolamino, dimethylcyclohexylamino, dimethylbenzylamino, triethylamino or pyridyl.

10. The cationic azo dye:

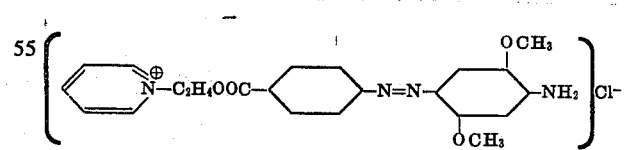

11. The cationic azo dye:

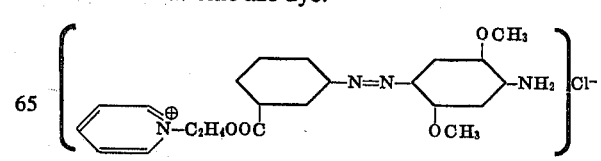

* * * * *